United States Patent
Kawasoe et al.

(10) Patent No.: US 12,119,439 B2
(45) Date of Patent: Oct. 15, 2024

(54) ENERGY STORAGE DEVICE

(71) Applicant: GS Yuasa International Ltd., Kyoto (JP)

(72) Inventors: Yudai Kawasoe, Kyoto (JP); Kenta Nagamine, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 166 days.

(21) Appl. No.: 16/764,212

(22) PCT Filed: Nov. 22, 2018

(86) PCT No.: PCT/EP2018/082214
§ 371 (c)(1),
(2) Date: May 14, 2020

(87) PCT Pub. No.: WO2019/105840
PCT Pub. Date: Jun. 6, 2019

(65) Prior Publication Data
US 2020/0395578 A1   Dec. 17, 2020

(30) Foreign Application Priority Data
Nov. 30, 2017   (JP) .................................. 2017-230906

(51) Int. Cl.
*H01M 10/0525* (2010.01)
*H01M 10/0563* (2010.01)
*H01M 50/103* (2021.01)

(52) U.S. Cl.
CPC ... *H01M 10/0525* (2013.01); *H01M 10/0563* (2013.01); *H01M 50/103* (2021.01); *H01M 2220/20* (2013.01); *H01M 2300/002* (2013.01)

(58) Field of Classification Search
CPC ...................................................... H01M 50/10
See application file for complete search history.

(56) References Cited

U.S. PATENT DOCUMENTS 9,118,085 B2 * 8/2015 Ikeda .................. H01M 10/052
2007/0128518 A1   6/2007 Uono et al.
(Continued)

FOREIGN PATENT DOCUMENTS

JP   2004-47332 A   2/2004
JP   2006-253126 A  9/2006
(Continued)

OTHER PUBLICATIONS

International Search Report (ISR) dated Feb. 14, 2019 filed in PCT/EP2018/082214.

*Primary Examiner* — Ula C Ruddock
*Assistant Examiner* — Sarika Gupta
(74) *Attorney, Agent, or Firm* — RANKIN, HILL & CLARK LLP (57) ABSTRACT

One aspect of the present invention is an energy storage device including: an electrode assembly including a negative electrode and a positive electrode that are stacked on each other with a separator interposed therebetween; a nonaqueous electrolyte containing a nonaqueous solvent; and a flat outer case housing the electrode assembly and the nonaqueous electrolyte, wherein the electrode assembly is disposed in the outer case in a compressed state so that the electrode assembly is pressurized in a direction of stack, a surface pressure acting on the outer case in the direction of stack is 1 k Pa or more, the nonaqueous solvent contains a fluorinated cyclic carbonate, and the nonaqueous electrolyte has an electric conductivity at 25° C. of 0.75 S/m or more.

8 Claims, 4 Drawing Sheets

(56)  References Cited

U.S. PATENT DOCUMENTS

| | | | |
|---|---|---|---|
| 2008/0038627 | A1 | 2/2008 | Yamauchi et al. |
| 2009/0176163 | A1 | 7/2009 | Wakita et al. |
| 2011/0206977 | A1 | 8/2011 | Ikeda |
| 2013/0108923 | A1 | 5/2013 | Nakanishi et al. |
| 2014/0255796 | A1 | 9/2014 | Matsuoka et al. |
| 2016/0268626 | A1* | 9/2016 | Ishida .................. H01M 4/587 |
| 2016/0351960 | A1 | 12/2016 | Nakatsutsumi et al. |
| 2017/0271671 | A1* | 9/2017 | Yamamoto ............ H01M 4/505 |
| 2017/0346071 | A1 | 11/2017 | Ogata et al. |
| 2018/0277900 | A1 | 9/2018 | Abe et al. |

FOREIGN PATENT DOCUMENTS

| | | | |
|---|---|---|---|
| JP | 2007-42329 A | | 2/2007 |
| JP | 2008-66137 A | | 3/2008 |
| JP | 2008-66254 A | | 3/2008 |
| JP | 2009-164053 A | | 7/2009 |
| JP | 2010-113966 A | | 5/2010 |
| JP | 2010-192459 A | | 9/2010 |
| JP | 2010-262905 A | | 11/2010 |
| JP | 2011-134685 A | | 7/2011 |
| JP | 2012009270 | * | 1/2012 |
| JP | 2012009270 A | * | 1/2012 |
| JP | 2012-23048 A | | 2/2012 |
| JP | 2013-98058 A | | 5/2013 |
| JP | 2013-187021 A | | 9/2013 |
| JP | 2014-63671 A | | 4/2014 |
| JP | 2015-5443 A | | 1/2015 |
| JP | 2016-219420 A | | 12/2016 |
| JP | 20170063270 | * | 6/2017 |
| JP | 20170063270 A | * | 6/2017 |
| WO | 2012/032700 A1 | | 3/2012 |
| WO | 2016/151983 A1 | | 9/2016 |
| WO | 2017/057588 A1 | | 4/2017 |

\* cited by examiner

ENERGY STORAGE DEVICE

TECHNICAL FIELD

The present invention relates to an energy storage device.

BACKGROUND ART

Secondary batteries typified by lithium ion secondary batteries are heavily used in electronic devices such as personal computers and communication terminals, automobiles, and the like because of their high energy density.

An example of such secondary batteries is disclosed in Patent Document 1. The secondary battery is a nonaqueous electrolyte secondary battery including an electrode assembly obtained by winding a negative electrode and a positive electrode with a separator interposed therebetween, and an outer case housing the electrode assembly.

PRIOR ART DOCUMENT

Patent Document

Patent Document 1: JP-A-2008-066254

SUMMARY OF THE INVENTION

Problem to be Solved by the Invention

As the nonaqueous electrolyte secondary battery is repeatedly charged and discharged, the nonaqueous electrolyte secondary battery is sometimes expanded due to a gas or the like generated inside the nonaqueous electrolyte secondary battery. It is known that the expansion of the nonaqueous electrolyte secondary battery can be suppressed by pressurizing the plates in the direction of stack of the plates.

The present inventors found that due to expansion of the electrode group during charging in a state where the plates are pressurized from outside the outer case in the direction of stack, the holes of the separator, the positive electrode, and the negative electrode are crushed to increase the polarization, and lithium or the like is easily electrodeposited, and as a result, the charge-discharge cycle characteristics of the energy storage device, such as coulombic efficiency, may deteriorate.

The present invention has been made in view of the above-mentioned circumstances, and it is an object of the present invention to provide an energy storage device capable of suppressing decrease in coulombic efficiency in charge-discharge cycles even in a state where an electrode assembly is pressurized from outside an outer case.

Means for Solving the Problem

One aspect of the present invention made for solving the above-mentioned problem is an energy storage device including: an electrode assembly including a negative electrode and a positive electrode that are stacked on each other with a separator interposed therebetween; a nonaqueous electrolyte containing a nonaqueous solvent; and a flat outer case housing the electrode assembly and the nonaqueous electrolyte, wherein the electrode assembly is disposed in the outer case in a compressed state so that the electrode assembly is pressurized in a direction of stack, a surface pressure acting on the outer case in the direction of stack is 1 kPa or more, the nonaqueous solvent contains a fluorinated cyclic carbonate, and the nonaqueous electrolyte has an electric conductivity at 25° C. of 0.75 S/m or more.

Advantages of the Invention

According to the present invention, it is possible to provide an energy storage device capable of suppressing decrease in coulombic efficiency in charge-discharge cycles even in a state where an electrode assembly is pressurized from outside an outer case.

MODE FOR CARRYING OUT THE INVENTION

The present inventors found that due to expansion of the electrode group during charging in a state where the plates of the nonaqueous electrolyte secondary battery are pressurized in the direction of stack, the holes of the separator, the positive electrode, and the negative electrode are crushed to increase the polarization, and lithium or the like is easily electrodeposited, and consequently the charge-discharge cycle characteristics of the energy storage device, such as coulombic efficiency, may deteriorate. In order to solve this problem, the present inventors also found that the decrease in coulombic efficiency in charge-discharge cycles can be suppressed using a specific nonaqueous solvent.

One aspect of the present invention is an energy storage device including: an electrode assembly including a negative electrode and a positive electrode that are stacked on each other with a separator interposed therebetween; a nonaqueous electrolyte containing a nonaqueous solvent; and a flat outer case housing the electrode assembly and the nonaqueous electrolyte, wherein the electrode assembly is disposed in the outer case in a compressed state so that the electrode assembly is pressurized in a direction of stack, a surface pressure acting on the outer case in the direction of stack is 1 kPa or more, the nonaqueous solvent contains a fluorinated cyclic carbonate, and the nonaqueous electrolyte has an electric conductivity at 25° C. of 0.75 S/m or more.

With this energy storage device, even in a state where the electrode assembly is pressurized, it is possible to suppress decrease in coulombic efficiency in charge-discharge cycles. The reason why such an effect is produced is not clear, but it is thought as follows.

As described above, it is known that the expansion of the energy storage device is suppressed by pressurizing the plates in the direction of stack of the plates. Specifically, expansion of the energy storage device can be suppressed by pressurizing the plates so that a surface pressure is applied to the outer case. The present inventors found that due to expansion of the electrode group during charging of the energy storage device, when the electrode assembly is pressurized so that a surface pressure of 1 kPa or more is applied to the outer case, the holes of the separator, the positive electrode plate, and the negative electrode plate are crushed to consequently increase the polarization of the energy storage device, lithium or the like is easily electrodeposited, and the capacity is decreased. The present inventors also found that the decrease in capacity due to electrodeposition of lithium or the like is accompanied by decrease in coulombic efficiency. Since a fluorinated cyclic carbonate has a high viscosity, a fluorinated cyclic carbonate electrolyte solution has a relatively low electric conductivity. Such a nonaqueous solvent having a low electric conductivity is known to contribute to electrodeposition because the solvent increases the polarization of the energy storage device. Meanwhile, since the activation energy of the fluorinated cyclic carbonate for desolvation is smaller than those of generally used cyclic carbonates and the like, use of a fluorinated cyclic carbonate nonaqueous solvent is thought to facilitate the insertion reaction into the negative electrode.

It is presumed from these facts that achieving both the electric conductivity of the nonaqueous electrolyte and the insertion reaction into the negative electrode using an electrolyte solution having an electric conductivity that is improved by the adjustment of the composition of the nonaqueous solvent makes it possible to suppress electrodeposition due to increase in polarization, and as a result, the energy storage device can suppress decrease in coulombic efficiency in charge-discharge cycles even in a state where the electrode assembly is pressurized.

The volume percentage of the fluorinated cyclic carbonate in the nonaqueous solvent may be 3 vol % or more and 50 vol % or less. When the volume percentage of the fluorinated cyclic carbonate is within the above-mentioned range, it is possible to further suppress decrease in coulombic efficiency in charge-discharge cycles.

The fluorinated cyclic carbonate may be fluoroethylene carbonate. When the fluorinated cyclic carbonate is fluoroethylene carbonate, it is possible to further suppress decrease in coulombic efficiency in charge-discharge cycles.

The energy storage device may further include a pressing member that pressurizes the electrode assembly in the direction of stack. When the energy storage device includes the pressing member, it is possible to pressurize the electrode assembly more reliably, and to suppress the expansion of the energy storage device more effectively.

Hereinafter, the energy storage device according to the present invention will be described in detail with reference to the drawings.

<Energy Storage Device>

Hereinafter, a nonaqueous electrolyte energy storage device that is a secondary battery will be described as an example of the energy storage device. The nonaqueous electrolyte energy storage device has an electrode assembly, a nonaqueous electrolyte, and a flat outer case housing the electrode assembly and the nonaqueous electrolyte. The electrode assembly includes a negative electrode and a positive electrode that are stacked on each other with a separator interposed therebetween. Usually, the positive electrode and the negative electrode form a wound electrode assembly or a stacked electrode assembly in which positive electrodes and negative electrodes are alternately superimposed on each other with a separator interposed therebetween. In the nonaqueous electrolyte energy storage device, a nonaqueous electrolyte described in detail below is used as the nonaqueous electrolyte. The nonaqueous electrolyte is interposed between the positive electrode and the negative electrode.

Figure 1:
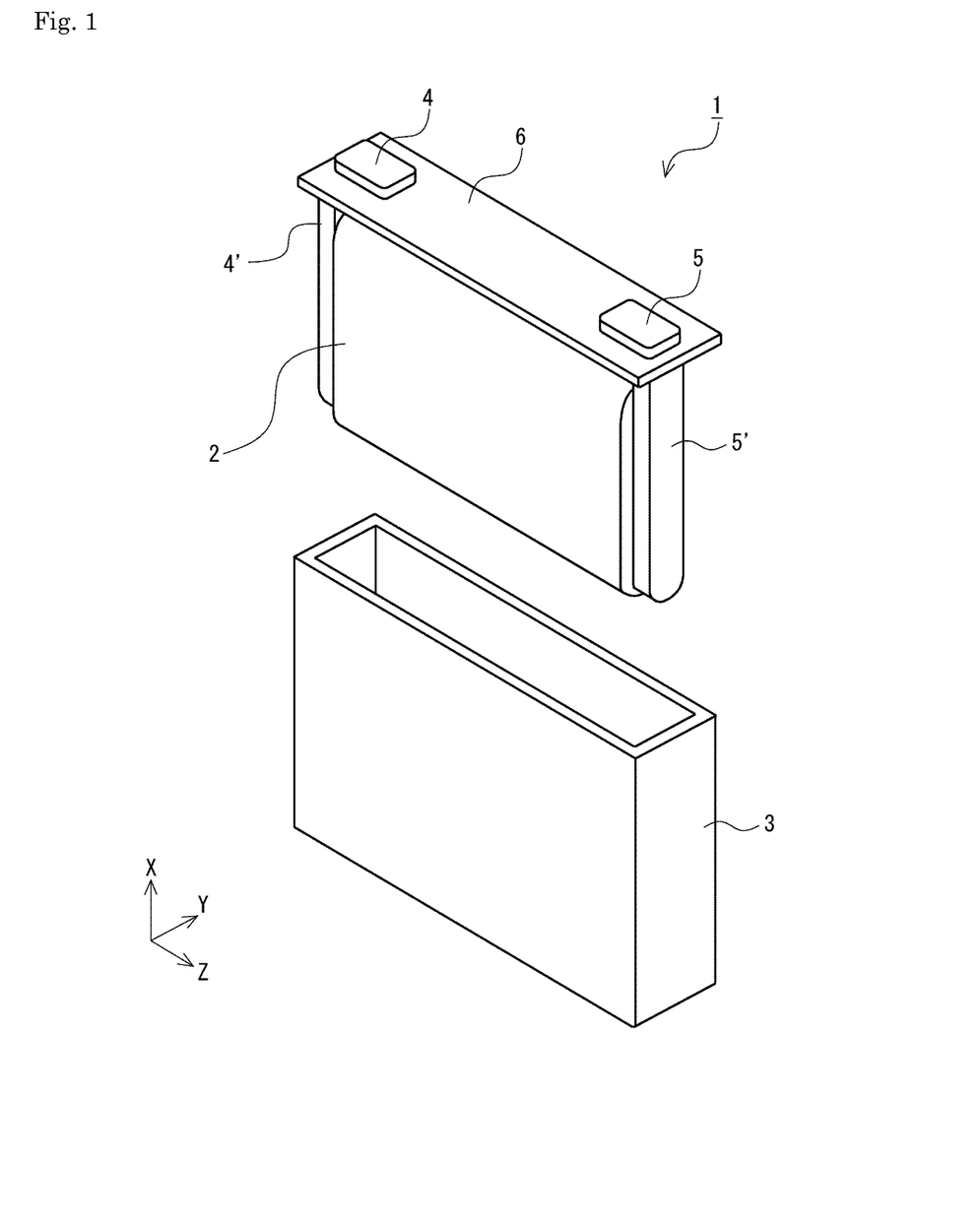
FIG. 1 is a schematic exploded perspective view showing a part of a nonaqueous electrolyte energy storage device according to one embodiment of the present invention.

FIG. 1 is a schematic exploded perspective view showing an electrode assembly and an outer case of a nonaqueous electrolyte energy storage device that is an energy storage device according to one embodiment of the present invention. A nonaqueous electrolyte energy storage device 1 includes an electrode assembly 2, a positive electrode current collector 4' and a negative electrode current collector 5' respectively connected to both ends of the electrode assembly 2, and an outer case 3 for housing these components. In the nonaqueous electrolyte energy storage device 1, the electrode assembly 2 is housed in the outer case 3, and a nonaqueous electrolyte is disposed in the outer case 3. The electrode assembly 2 is formed by winding a positive electrode having a positive active material and a negative electrode having a negative active material in a flat shape with a separator interposed therebetween. The positive electrode is electrically connected to a positive electrode terminal 4 via the positive electrode current collector 4', while the negative electrode is electrically connected to a negative electrode terminal 5 via the negative electrode current collector 5'.

Figure 2:
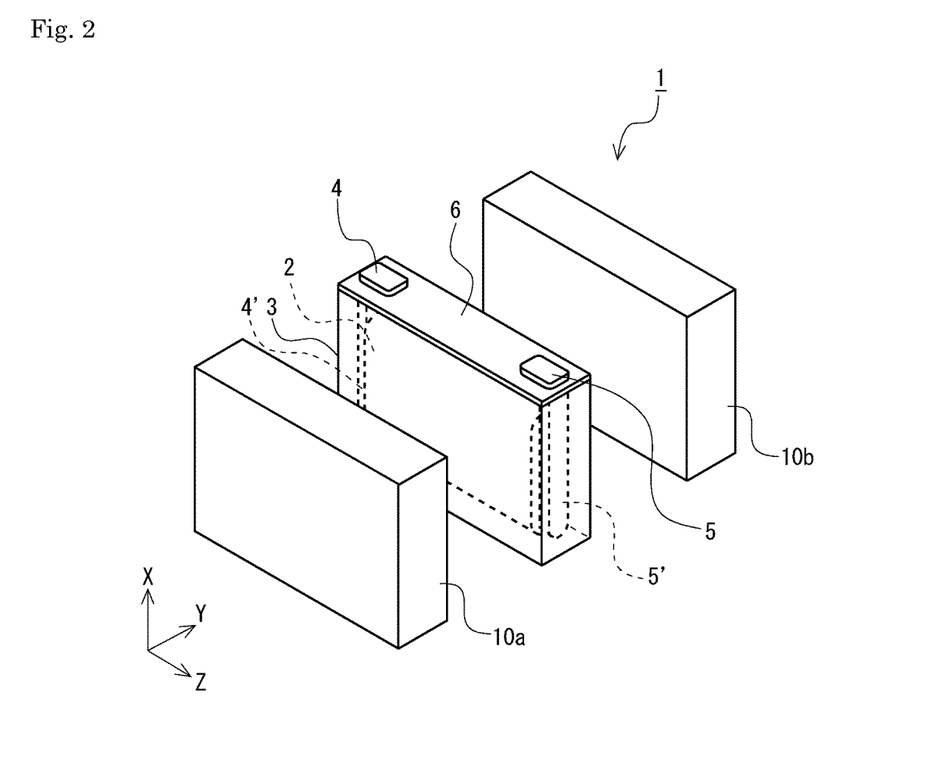
FIG. 2 is a schematic exploded perspective view showing the entirety of the nonaqueous electrolyte energy storage device according to one embodiment of the present invention.
Figure 3:
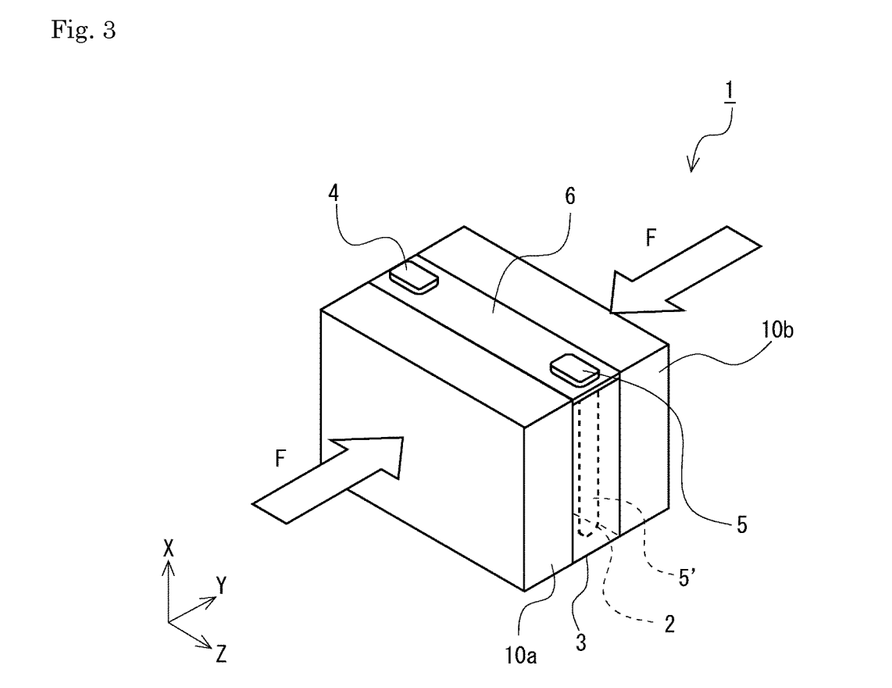
FIG. 3 is a schematic perspective view showing the nonaqueous electrolyte energy storage device according to one embodiment of the present invention.

FIGS. 2 and 3 are drawings showing an overall structure of the nonaqueous electrolyte energy storage device 1. As shown in FIGS. 2 and 3, the nonaqueous electrolyte energy storage device 1 further includes a pair of a pressing member 10a and a pressing member 10b that pressurize the electrode assembly 2 from outside the outer case 3 so as to sandwich the electrode assembly 2 from the sides of both surfaces in the direction of stack. Since the nonaqueous electrolyte energy storage device 1 includes the pressing member 10a and the pressing member 10b, the electrode assembly 2 is disposed in the outer case 3 in a compressed state so that the electrode assembly 2 is pressurized in the direction of stack indicated by the arrow F.

[Outer Case]

The outer case 3 is a rectangular parallelepiped casing that houses the electrode assembly 2, the positive electrode current collector 4', and the negative electrode current collector 5', and is open at one surface (top surface) perpendicular to a second direction (X direction). Specifically, the outer case 3 has a bottom surface, a pair of long side surfaces facing in a third direction (Y direction), and a pair of short side surfaces facing in a first direction (Z direction). The top surface is closed with a lid 6. The outer case 3 and the lid 6 are made of metal plates. The material of the metal plates may be, for example, aluminum.

The lid 6 is provided with the positive electrode terminal 4 and the negative electrode terminal 5 that are conductive to the outside. The positive electrode terminal 4 is connected to the positive electrode current collector 4', and the negative electrode terminal 5 is connected to the negative electrode current collector 5'. Further, in the case where the energy storage device is a nonaqueous electrolyte energy storage device, a nonaqueous electrolyte (electrolyte solution) is poured into the outer case 3 from a pouring hole (not shown) provided in the lid 6.

[Electrode Assembly]

The electrode assembly 2 has a positive electrode, a negative electrode, and a separator that insulates between the positive electrode and the negative electrode. In the electrode assembly 2, the positive electrode and the negative electrode are alternately stacked on each other with a separator interposed therebetween. The electrode assembly 2 is a wound electrode assembly obtained by winding a sheet material including a positive electrode, a negative electrode, and a separator in a flat shape. That is, the electrode assembly 2 has an elliptical shape having a minor axis and a major axis as viewed in the winding axis direction. The electrode assembly 2 is disposed in the outer case 3 in a compressed state so that the electrode assembly 2 is pressurized in the direction of stack (minor axis direction).

[Pressing Member]

Each of the paired pressing member 10a and pressing member 10b has a flat pressing surface. The paired pressing member 10a and pressing member 10b are provided so that they may respectively come into contact with the pair of long side surfaces of the outer case 3 at a specific surface pressure. That is, the paired pressing member 10a and pressing member 10b pressurizes the outer case 3 by sandwiching the outer case 3 from the sides of both surfaces of the electrode assembly 2 in the direction of stack. Accordingly, the electrode assembly 2 is pressurized in the direction of stack from outside the outer case 3, and is disposed in the outer case 3 in a compressed state.

The compressed state is a state in which the electrode assembly 2 is in contact with the outer case 3 and is pressurized from the outer case 3. In the case where the nonaqueous electrolyte energy storage device 1 has the pressing members, it is possible to pressurize the electrode assembly disposed in the outer case 3 more reliably, and to enhance the effect of suppressing the expansion of the nonaqueous electrolyte energy storage device 1. Further, in an energy storage apparatus including a plurality of energy storage devices, the pressing member 10a and the pressing member 10b can also serve as partition members for separating adjacent energy storage devices. The number of pressing members is not limited to one pair. For example, it is possible to pressurize one energy storage device by a pressing member from one side in the direction of stack of the electrode assembly 2, and pressurize the energy storage device by another energy storage device from the other side in the direction of stack. Alternatively, it is also possible to arrange a plurality of energy storage devices side by side in the direction of stack of the electrode assembly 2, and fix the plurality of energy storage devices using a frame or the like with the energy storage devices being pressurized from both ends in the direction of stack.

The lower limit of the surface pressure applied by the pressing member 10a and the pressing member 10b to the outer case 3 from the sides of both surfaces in the direction of stack of the electrode assembly 2 is 1 kPa, more preferably 50 kPa. When the lower limit of the surface pressure is within the above-mentioned range, expansion of the nonaqueous electrolyte energy storage device 1 can be suppressed more effectively. On the other hand, the upper limit of the surface pressure is preferably 5000 kPa, more preferably 2000 kPa. When the upper limit of the surface pressure is within the above-mentioned range, crushing of the holes of the positive electrode plate and the negative electrode plate can be suppressed.

The surface pressure is measured by the following method. The thickness of the pressurized energy storage device is measured as the energy storage device thickness under pressure. The pressure is released, and then a load cell is attached to the pressurized surface of the outer case. The outer case is pressurized until the energy storage device comes to have the energy storage device thickness under pressure, and the energy storage device is charged and discharged while the pressing force during the pressurization is measured. In the charge-discharge, constant current discharge is performed up to a voltage at which the SOC reaches 0% at a current of 0.2 CA, and then constant current constant voltage charge for a total charging time of 8 hours is performed up to a voltage at which the SOC reaches 100% at a current of 0.2 CA. The maximum pressing force during the charge-discharge is divided by the area of the pressurized surface of the outer case to calculate the surface pressure. The area of the pressurized surface is the area of a region of the outer case that overlaps the positive composite layer and the negative composite layer as viewed in the direction of stack of the electrode assembly 2.

[Nonaqueous Electrolyte]

The nonaqueous electrolyte contains a nonaqueous solvent. The nonaqueous electrolyte may further contain an electrolyte salt. Note that the nonaqueous electrolyte is not limited to a liquid. That is, the nonaqueous electrolyte is not limited to a liquid, but may be a solid or gel-like nonaqueous electrolyte.

(Nonaqueous Solvent)

The nonaqueous solvent contains a fluorinated cyclic carbonate, and the nonaqueous electrolyte has an electric conductivity at 25° C. of 0.75 S/m or more. It is considered that when the nonaqueous solvent contains a fluorinated cyclic carbonate and the nonaqueous electrolyte has an electric conductivity at 25° C. of 0.75 S/m or more, both the electric conductivity of the nonaqueous electrolyte and the insertion reaction into the negative electrode can be achieved, and electrodeposition due to increase in polarization can be suppressed. Accordingly, it is considered that decrease in coulombic efficiency in charge-discharge cycles of the nonaqueous electrolyte energy storage device 1 can be suppressed.

(Fluorinated Cyclic Carbonate)

The fluorinated cyclic carbonate is a compound in which part or all of hydrogen atoms of cyclic carbonates such as ethylene carbonate, propylene carbonate, and butylene carbonate are substituted with fluorine atoms.

Examples of the fluorinated cyclic carbonate include fluorinated ethylene carbonate such as fluoroethylene carbonate (FEC) and difluoroethylene carbonate, fluorinated propylene carbonate, and fluorinated butylene carbonate. Fluorinated ethylene carbonate is preferable, and fluoroethylene carbonate is more preferable. When the fluorinated cyclic carbonate is fluoroethylene carbonate, it is possible to further suppress decrease in coulombic efficiency in charge-discharge cycles. The fluorinated cyclic carbonate may be a single compound or a mixture of two or more compounds.

The lower limit of the content of the fluorinated cyclic carbonate in the nonaqueous solvent is preferably 3 vol %, more preferably 5 vol %. On the other hand, the upper limit of the content is preferably 50 vol %, more preferably 30 vol %, still more preferably 20 vol %, further preferably 15 vol %. When the content of the fluorinated cyclic carbonate is within the above-mentioned range, it is possible to further increase the coulombic efficiency in charge-discharge cycles.

The lower limit of the electric conductivity of the nonaqueous electrolyte at 25° C. is 0.75 S/m, more preferably 0.90 S/m. When the electric conductivity of the nonaqueous electrolyte at 25° C. is within the above-mentioned range, it is possible to suppress decrease in coulombic efficiency in charge-discharge cycles. The electric conductivity of the nonaqueous electrolyte is measured using LAQUA act D-74 manufactured by HORIBA, Ltd. using a general purpose electric conductivity cell 3552-10D manufactured by HORIBA, Ltd. as an electrode. In addition, to calibrate the electrode before use, a potassium chloride standard solution according to the Japanese Pharmacopoeia Sixteenth Edition, 2.51 Conductivity Measurement is used.

(Other Nonaqueous Solvents)

As a nonaqueous solvent other than the fluorinated cyclic carbonate, known nonaqueous solvents usually used as a nonaqueous solvent in a nonaqueous electrolyte of a general energy storage device can be used. Examples of the nonaqueous solvent include cyclic carbonates, linear carbonates, esters, ethers, amides, sulfones, lactones, and nitriles.

Examples of the cyclic carbonates include ethylene carbonate (EC), propylene carbonate (PC), butylene carbonate (BC), vinylene carbonate (VC), vinyl ethylene carbonate (VEC), chloroethylene carbonate, styrene carbonate, catechol carbonate, 1-phenyl vinylene carbonate, and 1,2-diphenyl vinylene carbonate. Among them, propylene carbonate is preferable.

Examples of the linear carbonates include diethyl carbonate (DEC), dimethyl carbonate (DMC), ethyl methyl carbonate (EMC), and diphenyl carbonate. Among them, dimethyl carbonate and ethyl methyl carbonate are preferable.

Among them, it is preferable to use, as the nonaqueous solvent other than the fluorinated cyclic carbonate, a linear carbonate or a combination of a cyclic carbonate and a linear carbonate from the viewpoint of improving the electric conductivity. The lower limit of the volume percentage of the linear carbonate in the nonaqueous solvent is preferably 65 vol %, more preferably 70 vol %. The upper limit of the volume percentage of the linear carbonate in the nonaqueous solvent is preferably 90 vol %, more preferably 85 vol %, still more preferably 80 vol %. The cyclic carbonate other than the fluorinated cyclic carbonate is preferably ethylene carbonate and propylene carbonate from the viewpoint that the electric conductivity can be increased. The cyclic carbonate other than the fluorinated cyclic carbonate is more preferably propylene carbonate from the viewpoint that decrease in coulombic efficiency can be further suppressed. The lower limit of the volume percentage of ethylene carbonate and propylene carbonate in the nonaqueous solvent is preferably 2 vol %, more preferably 5 vol %, still more preferably 8 vol %. The upper limit of the volume percentage of ethylene carbonate and propylene carbonate in the nonaqueous solvent is preferably 35 vol %, more preferably 25 vol %, still more preferably 15 vol %. The linear carbonate is preferably a combination of dimethyl carbonate and ethyl methyl carbonate. The lower limit of the volume ratio of ethyl methyl carbonate to dimethyl carbonate is preferably 2:1, more preferably 8:5, still more preferably 4:3. The upper limit of the volume ratio of ethyl methyl carbonate to dimethyl carbonate is preferably 2:7, more preferably 2:6, still more preferably 4:5. Further, it is also possible that the nonaqueous solvent contains a fluorinated cyclic carbonate and is substantially free of ethylene carbonate. Specifically, it is preferable that the nonaqueous solvent contain 20 vol % or less of a fluorinated cyclic carbonate and be substantially free of ethylene carbonate. More specifically, it is preferable that the nonaqueous solvent contain 15 vol % or less of a fluorinated cyclic carbonate and be substantially free of ethylene carbonate. When the contents of the fluorinated cyclic carbonate and ethylene carbonate are within the above-mentioned ranges, it is possible to further suppress decrease in coulombic efficiency. Specifically, it is preferable that the content of ethylene carbonate be 1 vol % or less.

(Electrolyte Salt)

As the electrolyte salt, a known electrolyte salt usually used as an electrolyte salt in a nonaqueous electrolyte of a general energy storage device can be used. Examples of the electrolyte salt include lithium salts, sodium salts, potassium salts, magnesium salts, and onium salts. Lithium salts are preferable.

Examples of the lithium salts include inorganic lithium salts such as $LiPF_6$, $LiPO_2F_2$, $LiBF_4$, $LiClO_4$, $LiN(SO_2O_2$, $LiB(C_2O_4)_2$, and $LiBF_2(C_2O_4)$, and lithium salts having a fluorinated hydrocarbon group such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among them, inorganic lithium salts are preferable, and $LiPF_6$ is more preferable.

The lower limit of the content of the electrolyte salt in the nonaqueous electrolyte is preferably 0.1 mol/dm$^3$, more preferably 0.3 mol/dm$^3$, still more preferably 0.5 mol/dm$^3$, particularly preferably 0.7 mol/dm$^3$. On the other hand, the upper limit of the content is not particularly limited, but is preferably 2.5 mol/dm$^3$, more preferably 2 mol/dm$^3$, still more preferably 1.5 mol/dm$^3$.

The nonaqueous electrolyte may contain components other than the nonaqueous solvent and the electrolyte salt. Such other components may be various additives contained in a nonaqueous electrolyte of a general energy storage device. The content of such other components may be preferably 5% by mass or less, more preferably 1% by mass or less.

The nonaqueous electrolyte can be obtained by adding the electrolyte salt to the nonaqueous solvent and dissolving the electrolyte salt.

[Positive Electrode]

The positive electrode includes a positive electrode substrate and a positive composite layer formed on an outer surface of the positive electrode substrate and containing a positive active material. Examples of the material of the positive electrode substrate include metals such as aluminum, titanium, tantalum, and stainless steel, and alloys of these metals. Among these, aluminum and an aluminum alloy are preferable from the viewpoint of balance among high withstand voltage characteristics, high electric conductivity, and cost. Further, examples of the form of the formed positive electrode substrate include foil and a vapor-deposited film. Foil is preferable from the viewpoint of cost. That is, aluminum foil is preferable as the positive electrode substrate. Examples of aluminum or an aluminum alloy include A1085P and A3003P specified in JIS-H-4000 (2014).

The positive composite that forms the positive composite layer contains optional components such as a conducting agent, a binder, a thickener, and a filler, if necessary.

Examples of the positive active material include composite oxides represented by $Li_xMO_y$ (wherein M represents at least one transition metal) (such as $Li_xCoO_2$, $Li_xNiO_2$, $Li_xMnO_3$, $Li_xNi_\alpha Co_{(1-\alpha)}O_2$, and $Li_xNi_\alpha Mn_\beta Co_{(1-\alpha-\beta)}O_2$ having a layered $\alpha$-NaFeO$_2$ type crystal structure, and $Li_xMn_2O_4$ and $Li_xNi_\alpha Mn_{(2-\alpha)}O_4$ having a spinel crystal structure), and polyanion compounds represented by $Li_wMe_x(XO_y)_z$ (wherein Me represents at least one transition metal, and X represents P, Si, B, V or the like) (such as $LiFePO_4$, $LiMnPO_4$, $LiNiPO_4$, $LiCoPO_4$, $Li_3V_2(PO_4)_3$, $Li_2MnSiO_4$, and $Li_2CoPO_4F$). Elements or polyanions in these compounds may be partially substituted with other elements or anion species. The positive composite layer may contain one of these compounds or a mixture of two or more of these compounds.

The conducting agent is not particularly limited. Examples of the conducting agent include natural or artificial graphite, carbon black such as furnace black, acetylene black, and ketjen black, metals, and conductive ceramics. Examples of the shape of the conducting agent include powdery and fibrous shapes.

Examples of the binder include thermoplastic resins such as fluororesins (such as polytetrafluoroethylene (PTFE) and polyvinylidene fluoride (PVDF)), polyethylene, polypropylene, and polyimide; elastomers such as ethylene-propylene-diene rubber (EPDM), sulfonated EPDM, styrene-butadiene rubber (SBR), and fluororubber; and polysaccharide polymers.

Examples of the thickener include polysaccharide polymers such as carboxymethylcellulose (CMC) and methylcellulose. When the thickener has a functional group reactive with lithium, it is preferable to previously deactivate the functional group by methylation or the like.

The filler is not particularly limited. Examples of the main component of the filler include polyolefins such as polypropylene and polyethylene, silica, alumina, zeolite, glass, and carbon.

[Negative Electrode]

The negative electrode includes a negative electrode substrate and a negative composite layer formed on an outer surface of the negative electrode substrate and containing a negative active material.

The negative electrode substrate may have the same structure as that of the positive electrode substrate. Examples of the material of the negative electrode substrate include metals such as copper, nickel, stainless steel, and nickel-plated steel, and alloys of these metals. Copper or a copper alloy is preferable. That is, copper foil is preferable as the negative electrode substrate. Examples of the copper foil include rolled copper foil and electrolytic copper foil.

The negative composite that forms the negative composite layer contains optional components such as a conducting agent, a binder, a thickener, and a filler, if necessary. The optional components used, such as the conducting agent, binder, thickener, and filler can be the same as those of the positive active material layer.

The negative active material used is usually a material that can occlude and release lithium ions. Specific examples of the negative active material include:

metals and semimetals such as Si and Sn;
metal oxides and semimetal oxides such as Si oxides and Sn oxides;
polyphosphoric acid compounds;
carbon materials such as graphite and non-graphite carbon (easily graphitizable carbon and non-graphitizable carbon); and
lithium metal composite oxides such as lithium titanate.

Further, the negative composite (negative composite layer) may contain typical nonmetal elements such as B, N, P, F, Cl, Br, and I, typical metal elements such as Li, Na, Mg, Al, K, Ca, Zn, Ga, and Ge, and transition metal elements such as Sc, Ti, V, Cr, Mn, Fe, Co, Ni, Cu, Mo, Zr, Ta, Hf, Nb, and W.

The energy storage device can provide a better effect of suppressing the expansion and a better effect of suppressing decrease in coulombic efficiency in charge-discharge cycles in the case where the negative electrode has a porosity of 40% or less after discharging, and the maximum expansion rate of the negative electrode excluding the negative electrode substrate after charging is 10% or more relative to the thickness of the negative electrode after discharging. The "porosity" of the negative electrode is a value based on volume, and is a value measured using a mercury porosimeter. Specifically, the porosity is a value measured by the following method. A measurement sample is subjected to the measurement as it is as long as it is a negative electrode before being assembled into an energy storage device. In the case where a sample is collected from a negative electrode taken out of a disassembled energy storage device, the energy storage device before being disassembled is brought into a discharged state according to the following procedure. First, constant current discharge is performed up to a voltage at which the SOC reaches 0% at a current of 0.2 CA to bring the energy storage device into an end-of-discharge state. Then, the energy storage device is disassembled and the negative electrode is taken out, and a step of immersing the negative electrode in dimethyl carbonate for 5 minutes is repeated twice. Then, the negative electrode is dried under reduced pressure for 24 hours at room temperature, and then a sample having an area of 2 cm×1 cm is produced and placed in a measurement glass cell. The pore volume and bulk volume of the negative electrode are measured using "AutoPore III9405" manufactured by Micromeritics Instrument Corp. The porosity (%) is calculated by the equation of porosity=pore volume×100/bulk volume.

The porosity (%) was calculated by the equation of porosity=pore volume×100/bulk volume.

The maximum expansion rate of the negative electrode is measured by the following method. First, the energy storage device is brought into a discharged state by the following procedure. Constant current discharge is performed up to a voltage at which the SOC reaches 0% at a current of 0.2 CA to bring the energy storage device into an end-of-discharge state. The energy storage device is disassembled, and the negative electrode is taken out. The thickness of the negative electrode excluding the substrate is defined as the negative composite thickness after discharging. Then, a battery is assembled using a positive electrode similarly taken out and the negative electrode, and constant current constant voltage charge for a total charging time of 8 hours is performed up to a voltage at which the SOC reaches 100% of the original energy storage device at a current of 0.2 CA to bring the battery into an end-of-charge state. The battery in the end-of-charge state is disassembled, and the negative electrode is taken out. The thickness of the negative electrode excluding the substrate is defined as the negative composite thickness after charging. The percentage obtained by subtracting the negative composite thickness after discharging from the negative composite thickness after charging and dividing the resulting value by the negative composite thickness after discharging is defined as the maximum expansion rate of the negative electrode excluding the negative electrode substrate after charging relative to the thickness of the negative electrode after discharging.

[Separator]

Examples of the material of the separator include a woven fabric, a nonwoven fabric, and a porous resin film. Among them, a porous resin film is preferable from the viewpoint of strength, and a nonwoven fabric is preferable from the viewpoint of the liquid retaining property of the nonaqueous electrolyte. The main component of the separator is preferably polyolefins such as polyethylene and polypropylene from the viewpoint of strength, and is preferably polyimide, aramid or the like from the viewpoint of resistance to oxidative decomposition. Further, these resins may be combined.

[Method for Manufacturing Energy Storage Device]

A method for manufacturing an energy storage device according to an embodiment of the present invention includes, for example, the steps of housing an electrode assembly in an outer case, pouring a nonaqueous electrolyte into the outer case, and providing a pair of pressing members and bringing the electrode assembly into a compressed state.

The nonaqueous electrolyte can be poured by a known method. After the pouring, the opening for pouring is sealed to give a nonaqueous electrolyte energy storage device. Details of elements that constitute the nonaqueous electrolyte energy storage device obtained by the manufacturing method are as described above.

[Other Embodiments]

The energy storage device of the present invention is not limited to the above-mentioned embodiment.

In the above-mentioned embodiment, a mode in which the nonaqueous electrolyte energy storage device is a secondary battery has been mainly described, but other energy storage devices may also be used. Examples of other energy storage devices include capacitors (electric double layer capacitors and lithium ion capacitors).

Further, in the above-mentioned embodiment, the energy storage device in which the outer case is a rectangular parallelepiped casing has been described. However, the flat outer case used may be a plate-shaped material that includes at least one insulating layer and that houses the electrode assembly (a pouch type outer case). The plate-shaped material used is, for example, suitably a metal-resin composite film (laminate film) including a metal layer and a resin layer laminated on an outer surface of the metal layer. A pouch type outer case is obtained by joining ends of the laminate films to seal the inside of the outer case.

In the above-mentioned embodiment, a wound electrode assembly is used. However, it is also possible to use a stacked electrode assembly formed of a layered product formed by stacking a plurality of sheet materials including a positive electrode plate, a negative electrode plate, and a separator.

In the above-mentioned embodiment, the surface pressure acting on the outer case in the direction of stack is set to 1 kPa or more using the pressing member. However, it is also possible to fix the battery to have a fixed size so that the battery itself expands to the outside to be brought into a compressed state in the outer case, and that a surface pressure of 1 kPa or more is applied to the outer case in the direction of stack.

The present invention can also be implemented as an energy storage apparatus having a plurality of energy storage devices described above. Further, an assembled battery may be constructed using one or a plurality of energy storage devices (cells) of the present invention, and an energy storage apparatus may be constructed using the assembled battery. The energy storage apparatus can be used as an automotive power supply for electric vehicles (EVs), hybrid electric vehicles (HEVs), plug-in hybrid electric vehicles (PHEVs), and the like.

EXAMPLES

Hereinafter, the present invention will be described more specifically with reference to examples, but the present invention is not limited to the following examples.

Example 1

(Production of Nonaqueous Electrolyte)

In a solvent that is a mixture of PC, DMC, EMC, and FEC at a volume ratio of 10:40:40:10, $LiPF_6$ was dissolved at a concentration of 1.2 mol/dm³ to prepare a nonaqueous electrolyte of Example 1.

(Measurement of Electric Conductivity of Nonaqueous Electrolyte)

The electric conductivity (S/m) at 25° C. of the nonaqueous electrolyte was measured using LAQUA act D-74 manufactured by HORIBA, Ltd. using a general purpose electric conductivity cell 3552-10D manufactured by HORIBA, Ltd. as an electrode. The results are shown in Table 1 below.

(Production of Energy Storage Device)

A positive electrode plate containing $LiNi_{0.80}Co_{0.15}Al_{0.05}O_2$ having an $\alpha$-$NaFeO_2$ type crystal structure as a positive active material was produced. A negative electrode plate containing graphite as a negative active material was also produced. Then, the positive electrode plate and the negative electrode plate were stacked on each other with a separator made of a polyethylene microporous film interposed therebetween, and the stack was wound in a flat shape to produce an electrode assembly. The electrode assembly was housed in a prismatic container case made of aluminum, and a positive electrode terminal and a negative electrode terminal were attached to the electrode assembly. The nonaqueous electrolyte was poured into the outer case (prismatic container case), and then the case was sealed. Then, a pair of pressing members was provided to give an energy storage device (prismatic lithium ion secondary battery having a design capacity of 40 Ah).

(Measurement of Porosity of Negative Electrode)

The porosity of the negative electrode after discharging was 25%.

The porosity was a value measured by the following method. A measurement sample is subjected to the measurement as it is as long as it is a negative electrode before being assembled into an energy storage device. In the case where a sample is collected from a negative electrode taken out of a disassembled energy storage device, the energy storage device before being disassembled is brought into a discharged state according to the following procedure. First, constant current discharge is performed up to a voltage at which the SOC reaches 0% at a current of 0.2 CA to bring the energy storage device into an end-of-discharge state. Then, the energy storage device is disassembled and the negative electrode is taken out, and a step of immersing the negative electrode in dimethyl carbonate for 1 minute is repeated twice to wash off the electrolyte solution attached to the negative electrode. The washed negative electrode is dried under reduced pressure for one day and night at room temperature, and then a sample having an area of 20 cm² is produced and placed in a measurement glass cell. The pore volume (mL) and bulk volume (mL) of the negative electrode are measured using "AutoPore III9405" manufactured by Micromeritics Instrument Corp.

The porosity (%) was calculated by the equation of porosity=pore volume×100/bulk volume.

(Measurement of Maximum Expansion Rate of Negative Electrode)

The maximum expansion rate of the negative electrode excluding the negative electrode substrate after charging relative to the thickness of the negative electrode after discharging was 15%. The maximum expansion rate was obtained by the following method. First, the energy storage device is brought into a discharged state by the following procedure. Constant current discharge is performed up to a voltage at which the SOC reaches 0% at a current of 0.2 CA to bring the energy storage device into an end-of-discharge state. The energy storage device is disassembled, and the negative electrode is taken out. The thickness of the negative electrode excluding the substrate is defined as the negative composite thickness after discharging. Then, a battery is assembled using a positive electrode similarly taken out and the negative electrode, and constant current constant voltage charge for a total charging time of 8 hours is performed up to a voltage at which the SOC reaches 100% of the original energy storage device at a current of 0.2 CA to bring the battery into an end-of-charge state. The battery in the end-of-charge state is disassembled, and the negative electrode is taken out. The thickness of the negative electrode excluding the substrate is defined as the negative composite thickness after charging. The percentage obtained by subtracting the negative composite thickness after discharging from the negative composite thickness after charging and dividing the resulting value by the negative composite thickness after discharging is defined as the maximum expansion rate of the negative electrode excluding the negative electrode substrate after charging relative to the thickness of the negative electrode after discharging.

(Measurement of Surface Pressure)

The surface pressure applied to the outer case was 100 kPa. The surface pressure was measured by the following method. The thickness of the pressurized energy storage device is measured as the energy storage device thickness under pressure. The pressure is released, and then a load cell is attached to the pressurized surface of the outer case. The outer case is pressurized until the energy storage device comes to have the energy storage device thickness under pressure, and the energy storage device is charged and discharged while the pressing force during the pressurization is measured. In the charge-discharge, constant current discharge is performed up to a voltage at which the SOC reaches 0% at a current of 0.2 CA, and then constant current constant voltage charge for a total charging time of 8 hours is performed up to a voltage at which the SOC reaches 100% at a current of 0.2 CA. The maximum pressing force during the charge-discharge is divided by the area of the pressurized surface of the outer case to calculate the surface pressure.

Examples 2 to 6 and Comparative Examples 1 to 5

Energy storage devices of Example 2 and Comparative Examples 1 to 5 were obtained similarly to Example 1 except that the types and contents of the compounds used were changed as shown in Table 1.

In Table 1 below, "–" indicates that the component was not used.

Reference Examples 1 to 6

Energy storage devices in which the types and contents of the compounds used were as shown in Table 1, to which no load was applied, and in which the surface pressure applied to the outer case was 0 were prepared as Reference Examples 1 to 6. Reference Examples 1 to 3 correspond to Examples 1 to 3, respectively, Reference Example 4 corresponds to Comparative Example 5, Reference Example 5 corresponds to Comparative Example 3, and Reference Example 6 corresponds to Comparative Example 2.

[Evaluation]
(Charge-Discharge Cycle Test: Coulombic Efficiency)
(1) Charge-Discharge Cycle Test Each nonaqueous electrolyte energy storage device was stored in a thermostatic chamber at 45° C. for 5 hours, and then subjected to constant current constant voltage charge at a charge current of 1 CA and an end-of-charge voltage of 4.35 V for a total charging time of 3 hours. Then, a 10-minute pause was put after charging. Then, the nonaqueous electrolyte energy storage device was subjected to constant current discharge at a discharge current of 1 CA and an end-of-discharge voltage of 2.5 V, and a 10-minute pause was put. This step of charging and discharging was regarded as one cycle, and the cycle was repeated 150 times. All of the charging, discharging, and pause were performed in the thermostatic chamber at 45° C.

(2) Coulombic Efficiency

The nonaqueous electrolyte of each nonaqueous electrolyte energy storage device after the charge-discharge cycle test was subjected to a capacity check test under the following conditions. The nonaqueous electrolyte energy storage device was subjected to constant current constant voltage (CCCV) charge at a charge current of 1 CA and an end-of-charge voltage of 4.35 V for a total charging time of 3 hours. The nonaqueous electrolyte energy storage device was subjected to constant current (CC) discharge at a discharge current of 1 CA and an end-of-discharge voltage of 2.5 V. The discharge capacity in this test was defined as "discharge capacity (Ah)" after 150-cycle test, and the percentage of the discharge capacity relative to the amount of charge (Ah) after the 150-cycle test was obtained as "coulombic efficiency (%) after 150-cycle test". The results are shown in the following Table 1 and FIGS. 4 and 5.

TABLE 1

| | Composition | | | | | Electric | | |
| --- | --- | --- | --- | --- | --- | --- | --- | --- |
| | Cyclic carbonate | | Linear carbonate | | Fluorinated cyclic carbonate | conductivity of nonaqueous electrolyte | Surface pressure | Coulombic efficiency after 150 cycles at 45° C. |
| | EC vol. % | PC vol. % | DMC vol. % | EMC vol. % | FEC vol. % | [25° C.] (S/m) | (kPa) | (%) |
| Example 1 | — | 10 | 40 | 40 | 10 | 0.92 | 100 | 99.8 |
| Example 2 | — | — | 40 | 50 | 10 | 0.84 | 100 | 99.7 |
| Example 3 | — | — | 20 | 70 | 10 | 0.77 | 100 | 99.6 |
| Example 4 | — | — | 40 | 40 | 20 | 0.85 | 100 | 99.2 |
| Example 5 | — | — | 40 | 30 | 30 | 0.95 | 100 | 98.9 |
| Example 6 | 10 | — | 40 | 40 | 10 | 0.93 | 100 | 98.8 |
| Comparative Example 1 | 20 | — | 40 | 40 | — | 0.91 | 100 | 96.9 |
| Comparative Example 2 | 25 | — | 20 | 55 | — | 0.91 | 100 | 96.5 |
| Comparative Example 3 | 25 | — | 40 | 35 | — | 0.98 | 100 | 96.3 |
| Comparative | 20 | — | — | 80 | — | 0.81 | 100 | 96.3 |

TABLE 1-continued

| | Composition | | | | Electric conductivity of nonaqueous electrolyte [25° C.] (S/m) | Surface pressure (kPa) | Coulombic efficiency after 150 cycles at 45° C. (%) |
|---|---|---|---|---|---|---|---|
| | Cyclic carbonate | | Linear carbonate | | Fluorinated cyclic carbonate | | |
| | EC vol. % | PC vol. % | DMC vol. % | EMC vol. % | FEC vol. % | | | |
| Example 4 Comparative Example 5 | — | — | — | 90 | 10 | 0.70 | 100 | 98.0 |
| Reference Example 1 | — | 10 | 40 | 40 | 10 | 0.92 | — | 99.9 |
| Reference Example 2 | — | — | 40 | 50 | 10 | 0.84 | — | 99.9 |
| Reference Example 3 | — | — | 20 | 70 | 10 | 0.77 | — | 99.8 |
| Reference Example 4 | — | — | — | 90 | 10 | 0.70 | — | 99.8 |
| Reference Example 5 | 25 | — | 40 | 35 | — | 0.98 | — | 99.6 |
| Reference example 6 | 25 | — | 20 | 55 | — | 0.91 | — | 99.6 |

Figure 4:
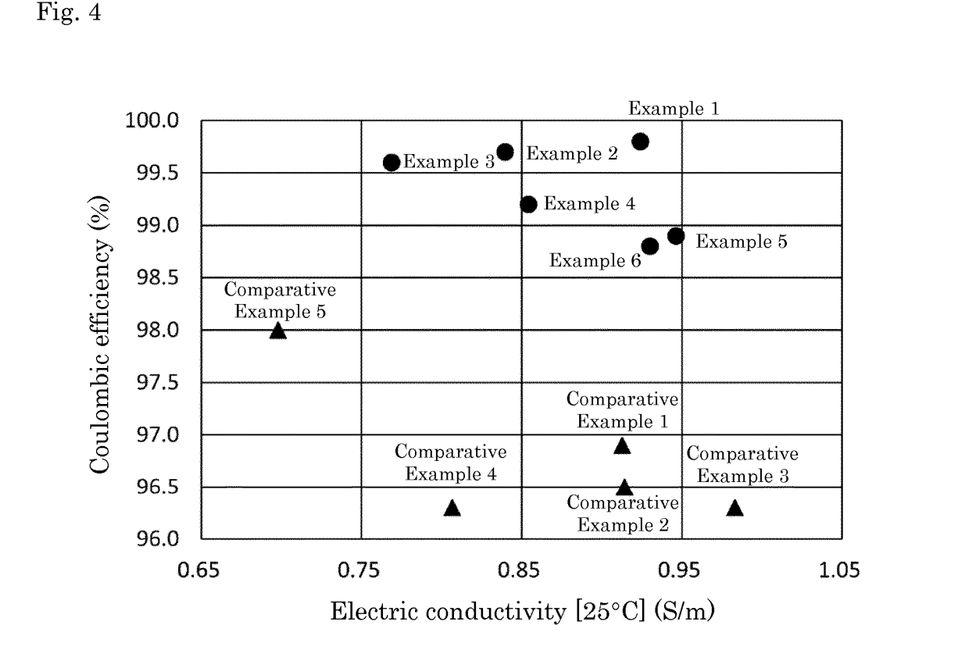
FIG. 4 is a graph showing a relationship between the electric conductivity and coulombic efficiency in examples.

As shown in Table 1 and FIG. 4, in Examples 1 to 6 in which the nonaqueous electrolyte contained a fluorinated cyclic carbonate and had an electric conductivity at 25° C. of 0.75 S/m or more, the energy storage device was excellent in coulombic efficiency after the charge-discharge cycles. In contrast, in Comparative Examples 1 to 4 in which the nonaqueous electrolyte contained EC and did not contain FEC, the energy storage device was inferior to the above-mentioned examples in coulombic efficiency after the charge-discharge cycles. In addition, also in Comparative Example 5 in which the nonaqueous electrolyte contained a fluorinated cyclic carbonate but had an electric conductivity at 25° C. of 0.70 S/m, the energy storage device was inferior to the above-mentioned examples in coulombic efficiency after the charge-discharge cycles.

Figure 5:
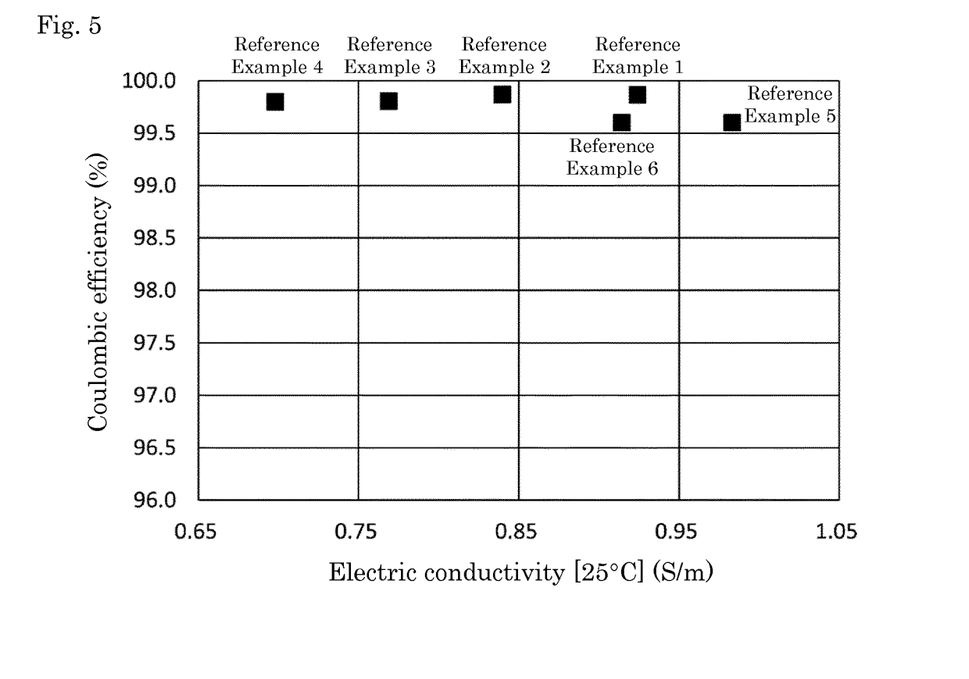
FIG. 5 is a graph showing a relationship between the electric conductivity and coulombic efficiency in reference examples.

As shown in FIG. 5, in Reference Examples 1 to 6 in which the outer case was not pressurized, a high coulombic efficiency was obtained regardless of the composition and electric conductivity, but the energy storage device was remarkably expanded.

INDUSTRIAL APPLICABILITY

As described above, the energy storage device according to the present invention can be suitably used as an automotive power supply for electric vehicles (EVs), hybrid electric vehicles (HEVs), plug-in hybrid electric vehicles (PHEVs), and the like.

DESCRIPTION OF REFERENCE SIGNS

1: Nonaqueous electrolyte energy storage device
2: Electrode assembly
3: Outer case
4: Positive electrode terminal
4': Positive electrode current collector
5: Negative electrode terminal
5': Negative electrode current collector
6: Lid
10a, 10b: Pressing member

The invention claimed is:

1. An energy storage device comprising: an electrode assembly including a negative electrode and a positive electrode that are stacked on each other with a separator interposed therebetween; a nonaqueous electrolyte containing a nonaqueous solvent; and a flat outer case housing the electrode assembly and the nonaqueous electrolyte, wherein the electrode assembly is disposed in the outer case in a compressed state so that the electrode assembly is pressurized in a direction of stack,
the energy storage device further comprises a pressing member that pressurizes the electrode assembly in the direction of stack,
a surface pressure acting on the outer case in the direction of stack is 100 kPa or more, the nonaqueous solvent contains a fluorinated cyclic carbonate, the nonaqueous electrolyte has an electric conductivity at 250 C of 0.75 S/m or more and 0.95 S/m or less, and the nonaqueous solvent further contains a linear carbonate.

2. The energy storage device according to claim 1, wherein a volume percentage of the fluorinated cyclic carbonate in the nonaqueous solvent is 3 vol % or more and 50 vol % or less.

3. The energy storage device according to claim 1, wherein the fluorinated cyclic carbonate is fluoroethylene carbonate.

4. The energy storage device according to claim 1, wherein a maximum expansion rate of the negative electrode excluding a negative electrode substrate after charging is 10% or more and 15% or less relative to a thickness of the negative electrode after discharging.

5. The energy storage device according to claim 1, wherein the negative electrode has a porosity of 25% or more and 40% or less after discharging.

6. The energy storage device according to claim 1, wherein the linear carbonate includes dimethyl carbonate and ethyl methyl carbonate.

7. The energy storage device according to claim 1, wherein a volume percentage of ethylene carbonate in the nonaqueous solvent is 1 vol % or less.

8. The energy storage device according to claim 1, wherein a volume percentage of the fluorinated cyclic carbonate in the nonaqueous solvent is 10 vol % or more and 30 vol % or less, and a volume percentage of the linear carbonate in the nonaqueous solvent is 70 vol % or more and 90 vol % or less.

* * * * *